US012782132B2

(12) United States Patent
Doyama et al.

(10) Patent No.: US 12,782,132 B2
(45) Date of Patent: Nov. 3, 2026

(54) SENSOR APPARATUS

(71) Applicant: Sumitomo Precision Products Co., Ltd., Amagasaki (JP)

(72) Inventors: Hideyuki Doyama, Amagasaki (JP); Ryohei Uchino, Amagasaki (JP)

(73) Assignee: Sumitomo Precision Products Co., Ltd., Amagasaki (JP)

( * ) Notice: Subject to any disclaimer, the term of this patent is extended or adjusted under 35 U.S.C. 154(b) by 218 days.

(21) Appl. No.: 18/845,577

(22) PCT Filed: Mar. 20, 2023

(86) PCT No.: PCT/JP2023/010888
§ 371 (c)(1),
(2) Date: Sep. 10, 2024

(87) PCT Pub. No.: WO2023/189821
PCT Pub. Date: Oct. 5, 2023

(65) Prior Publication Data

US 2025/0189310 A1 Jun. 12, 2025

(30) Foreign Application Priority Data

Mar. 28, 2022 (JP) ................................ 2022-052556

(51) Int. Cl.
*G01C 19/5783* (2012.01)
*G01D 11/24* (2006.01)

(52) U.S. Cl.
CPC ......... *G01C 19/5783* (2013.01); *G01D 11/24* (2013.01)

(58) Field of Classification Search
CPC ............... G01C 19/5783; G01D 11/24; G01D 2205/40; G01D 21/02; G01D 11/245; G01P 15/08
See application file for complete search history.

(56) References Cited

U.S. PATENT DOCUMENTS

2013/0111993 A1* 5/2013 Wang ........................ G01P 1/02 73/514.01
2021/0123943 A1 4/2021 Sakuma
(Continued)

FOREIGN PATENT DOCUMENTS

JP 4-245700 A 9/1992
JP 2002-90174 A 3/2002
(Continued)

OTHER PUBLICATIONS

International Search Report (PCT/ISA/210) issued in PCT Application No. PCT/JP2023/010888 dated May 23, 2023 with English translation (5 pages).
(Continued)

*Primary Examiner* — David Z Huang
(74) *Attorney, Agent, or Firm* — Crowell & Moring LLP

(57) ABSTRACT

A sensor apparatus (100) according to this invention includes a plurality of sensors (2) for detecting physical quantities; a sensor arrangement part (1) including a plurality of recessed parts (11) that are opened in different directions from each other and in which the plurality of sensors (2) are arranged; shielding lids (7) for shielding against electromagnetic noise arranged between the recessed parts (11) and the shielding cover (4) and covering the plurality of recessed parts (11) to prevent exposure of the plurality of sensors (2) that are arranged in the plurality of recessed parts (11).

11 Claims, 5 Drawing Sheets

(56) References Cited

U.S. PATENT DOCUMENTS

| | | | | |
|---|---|---|---|---|
| 2021/0123947 | A1 | 4/2021 | Ozawa | |
| 2023/0044834 | A1* | 2/2023 | Mogill | B60R 16/0207 |

FOREIGN PATENT DOCUMENTS

| | | | |
|---|---|---|---|
| JP | 2013-540987 | A | 11/2013 |
| JP | 2021-67625 | A | 4/2021 |
| JP | 2021-67630 | A | 4/2021 |

OTHER PUBLICATIONS

Japanese-language Written Opinion (PCT/ISA/237) issued in PCT Application No. PCT/JP2023/010888 dated May 23, 2023 with English translation (7 pages).

* cited by examiner

SENSOR APPARATUS

TECHNICAL FIELD

The present invention relates to a sensor apparatus, and particularly to a sensor apparatus including a sensor arrangement part to which a plurality of sensors are provided.

BACKGROUND ART

Sensor apparatuses including a sensor arrangement part to which a plurality of sensors are provided are known in the art. Such a sensor apparatus is disclosed in Japanese Patent Laid-Open Publication No. JP 2021-67625, for example.

The inertial measurement device (sensor apparatus) described in Japanese Patent Laid-Open Publication No. JP 2021-67625 includes a printed circuit board (sensor arrangement part) to which a plurality of gyroscopes corresponding to X, Y and Z axes are provided. Also, the aforementioned inertial measurement device includes a case provided to cover the plurality of gyroscopes. In other words, the plurality of gyroscopes are accommodated in accommodation space defined by the printed circuit board and the case. The plurality of gyroscopes are arranged in the aforementioned accommodation space to be exposed from the accommodation space (in an uncovered state).

PRIOR ART

Patent Document

Patent Document 1: Japanese Patent Laid-Open Publication No. JP 2021-67625

SUMMARY OF THE INVENTION

Problems to be Solved by the Invention

In a case in which a plurality of gyroscopes (the same type of sensors) are arranged in a case as disclosed in Japanese Patent Laid-Open Publication No. JP 2021-67625, the plurality of gyroscopes are necessarily arranged at different positions and in different orientations in the case so as to correspond to the X, Y and Z axes. However, in the case in which the plurality of gyroscopes are arranged in the case to be exposed from the case as in disclosed in Japanese Patent Laid-Open Publication No. JP 2021-67625, an exterior surface of one of the sensors is close to and an exterior surface of another of the sensors is away from interior surfaces of components that form the case so that positions of exterior surfaces of the sensors, and distances between the exterior surfaces of the sensors and the interior surfaces of components become different depending on which sensor each exterior surface belongs. For this reason, influence of noise that enters the case becomes different depending on which sensor the influence affects.

The present invention is intended to solve the above problem, and one object of the present invention is to provide a sensor apparatus capable of reducing difference of influence of noise between a plurality of sensors in a case in which the plurality of sensors for detecting the same type of physical quantities are provided.

Means for Solving the Problems

In order to attain the aforementioned object, a sensor apparatus according to an aspect of the present invention includes a plurality of sensors for detecting a common type of physical quantities acting in two or more directions different from each other; a sensor arrangement part including a plurality of recessed parts that are opened in different directions from each other and in which the plurality of sensors are arranged; a shielding cover for shielding against electromagnetic noise, the shielding cover being arranged to cover the sensor arrangement part and including at least one first opening; and shielding lids for shielding against the electromagnetic noise, the shielding lids being arranged between the plurality of recessed parts and the shielding cover and covering the plurality of recessed parts to prevent exposure of the plurality of sensors that are arranged in the plurality of recessed parts.

In the sensor apparatus according to the aspect of the present invention, as discussed above, a shielding lid for shielding against electromagnetic noise is provided to be arranged between the recessed part included in the sensor arrangement part and the shielding cover covering the sensor arrangement part, and to cover the recessed part to prevent exposure of the sensor that is arranged in the recessed part. Accordingly, the shielding lid can provide electromagnetic noise shielding even if electromagnetic noise enters an interior of the shielding cover. In other words, electromagnetic noise shielding can be duplicately provided by the shielding cover and the shielding lid. In particular, in a case in which the recessed parts are formed by cutting-out machining, the sensors will be covered by the recessed parts without any gaps except opened sides of the recessed parts for the sensors. As a result, even if the plurality of sensors are arranged in a case, and the plurality of sensors are arranged in different positions and orientations in the sensor arrangement part, electromagnetic noise shielding can be duplicately provided by the shielding cover and the shielding lid. Consequently, it is possible to reduce difference of influence of noise between the plurality of sensors in a case in which the plurality of sensors for detecting the same type of physical quantities are arranged in positions and orientations different from each other.

In the sensor apparatus according to the aforementioned aspect, it is preferable that a controller for receiving information from the plurality of sensors is further provided; that at least one of the plurality of sensors includes a sensor main body, and a connection wiring part between the sensor main body and the controller; and that at least one of the plurality of recessed parts of the sensor arrangement part and/or at least one of the plurality of shielding lids includes a second opening through which the connection wiring part is drawn out. According to this configuration, even in a case in which the recessed part is covered by the shielding lid, the connection wiring part can be easily drawn out from the recessed part through the second opening.

In this configuration, it is preferable that the connection wiring part of the sensor includes a flexible cable. According to this configuration, since the connection wiring part can be drawn out from the recessed part while being bent, it is possible to easily draw the connection wiring part out of the recessed part.

In the sensor apparatus according to the aforementioned aspect, it is preferable that a base for shielding against the electromagnetic noise is provided to be fixed to the sensor arrangement part and to be arranged to close the first opening of the shielding cover and to cover at least one of the plurality of recessed parts. According to this configuration, since the base, which is fixed to the sensor arrangement member, also serves as a part for shielding the sensor from electromagnetic noise, it is possible to prevent a configuration of the sensor apparatus from becoming complicated while reducing the number of parts.

In this configuration, it is preferable that a projected area of the base as viewed in a direction perpendicular to surfaces of the base and the shielding cover that face each other is larger than an opening area of the first opening of the shielding cover. According to this configuration, since the first opening of the shielding cover is entirely covered by the base, it is possible to effectively reduce electromagnetic noise entering the shielding cover.

In the sensor apparatus according to the aforementioned aspect, it is preferable that all of the plurality of sensors that are arranged in the plurality of recessed parts of the sensor arrangement part and measure the common type of physical quantities are identical to each other in design. According to this configuration, since correction control of the sensor apparatus for correcting difference between the sensors due to difference of sensor designs can be eliminated, such elimination together with advantages of the present invention including reduction of influences of electromagnetic noise from the outside of the sensor apparatus and reduction of evenness of noise entering the sensors allows easy correction control of the sensor apparatus.

In this configuration, it is preferable that the plurality of sensors include one sensor set of a first-axis sensor, a second-axis sensor and a third-axis sensor corresponding a first axis, a second axis and a third axis perpendicular to each other or a plurality of sensor sets of first-axis sensors, second-axis sensors and third-axis sensors corresponding the first axis, the second axis and the third axis perpendicular to each other; and that the sensor arrangement part includes a first surface that extends perpendicular to the first axis and includes the recessed part in which the first axis sensor is arranged, a second surface that extends perpendicular to the second axis and includes the recessed part in which the second axis sensor is arranged, and a third surface that extends perpendicular to the third axis and includes the recessed part in which the third axis sensor is arranged. According to this configuration, it is possible to reduce difference between influences of noise on the first axis sensor, the second axis sensor, and the third axis sensor.

In the sensor apparatus in which at least one set of the first axis sensor, the second sensor and the third axis sensor are provided, it is preferable that the plurality of sensors include the plurality of sensor sets of the first-axis sensors, the second-axis sensors and the third-axis sensors. According to this configuration, it is possible to reduce difference between influences of noise on the first axis sensor, the second axis sensor, and the third axis sensor even in a case in which a plurality of sets of sensors are included.

In this configuration, it is preferable that two or more of the plurality of recessed parts of the sensor arrangement part in which the first axis sensors are arranged have a common shape; two or more of the plurality of recessed parts of the sensor arrangement part in which the second axis sensors are arranged have a common shape; and two or more of the plurality of recessed parts of the sensor arrangement part in which the third axis sensors are arranged have a common shape. According to this configuration, since two or more of the plurality of recessed parts have the common shape, it is possible to simplify production of the sensor arrangement part as compared with a case in which the two or more of the plurality of recessed parts have shapes different from each other. Also, the two or more of the plurality of recessed parts for a plurality of the first-axis sensors (a plurality of the second-axis sensors, a plurality of the third-axis sensors) have the common shape, distances between interior surfaces of the recessed parts and exterior surfaces of the sensors can be the same in the plurality of the first-axis sensors (the plurality of the second-axis sensors, the plurality of the third-axis sensors), and as a result, it is possible to reduce noise influence difference between the plurality of the first-axis sensors (between the plurality of the second-axis sensors, between the plurality of the third-axis sensors).

In the sensor apparatus in which two or more of the plurality of recessed parts have the common shape, it is preferable that the sensor arrangement part has a rectangular parallelepiped shape. According to this configuration, it is possible to easily arrange the first axis sensor, the second axis sensor and the third axis sensor to correspond to the first axis, the second axis and the third axis, respectively, which are perpendicular to each other.

In the sensor apparatus according to the aforementioned aspect, it is preferable that each of the sensors includes a gyroscope. Here, the gyroscopes process very small signals, and are susceptible to electromagnetic noise. For this reason, electromagnetic noise shielding provided by the shielding lid is particularly effective at properly operating the gyroscopes.

In the sensor apparatus according to the aforementioned aspect, it is preferable that the shielding lid has a plate-like shape extending along a surface of the sensor arrangement part. According to this configuration, since a protrusion height of the shielding lid from the sensor arrangement part can be small, it is possible to reduce size of the sensor apparatus as compared with a case in which the shielding lid has a box shape, for example.

In the sensor apparatus according to the aforementioned aspect, it is preferable that the shielding lid includes a non-magnetic material. According to this configuration, since electromagnetic noise shielding can be more reliably provided by the shielding lid, it is possible to more reliably prevent anomalies caused by electromagnetic noise in the sensors covered by the shielding lid.

Effect of the Invention

According to the present invention, as discussed above, it is possible to reduce difference of influence of noise between the plurality of sensors in a case in which the plurality of sensors for detecting the same type of physical quantities are provided.

MODES FOR CARRYING OUT THE INVENTION

Embodiments according to the present invention will be described with reference to the drawings.

A sensor apparatus 100 according to one embodiment is first described with reference to FIGS. 1 to 7.

Entire Configuration of Sensor Apparatus

Figure 1:
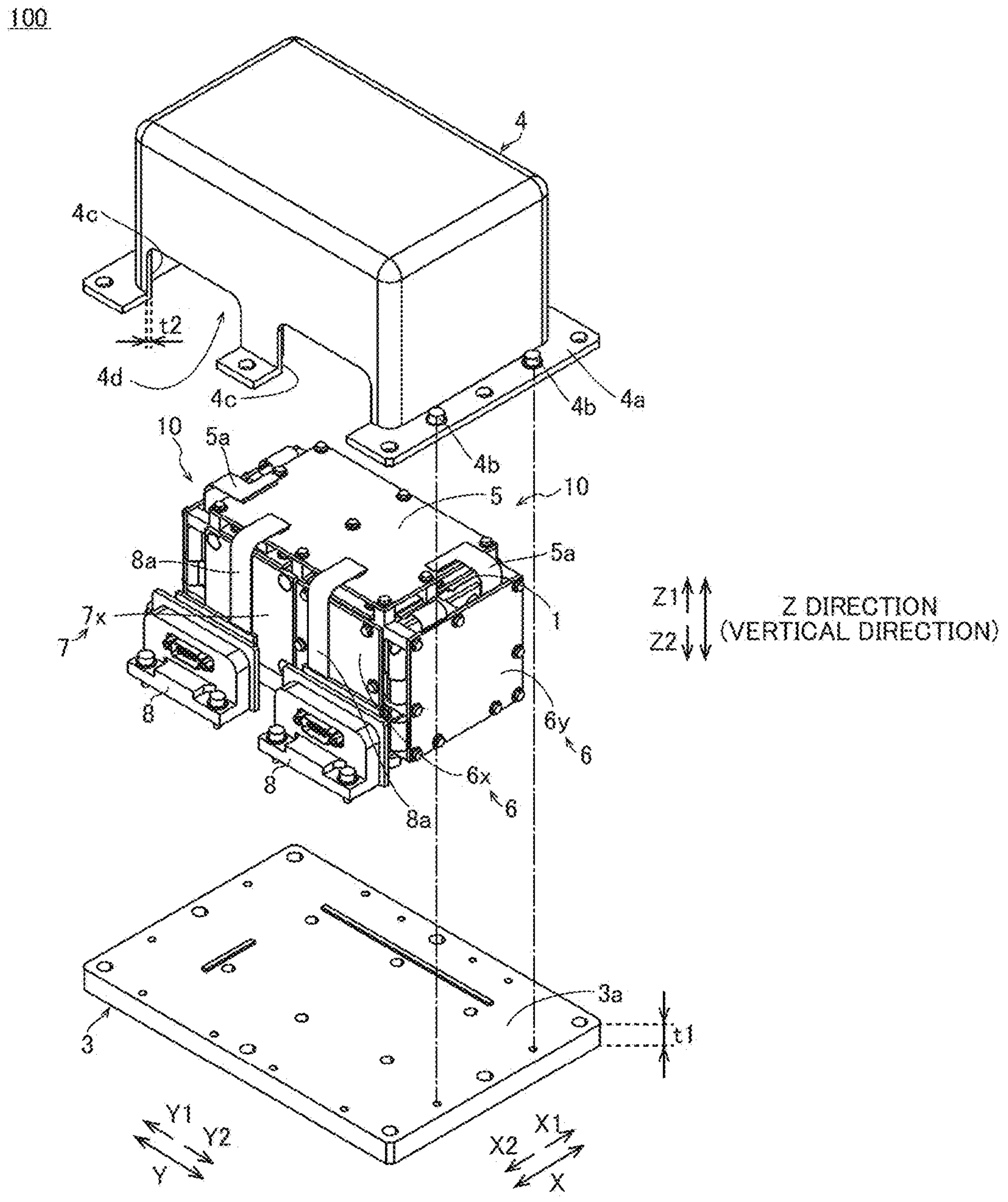
FIG. 1 is an exploded perspective view entirely showing a sensor apparatus according to one embodiment.

As shown in FIG. 1, the sensor apparatus 100 includes a sensor mount 1, gyroscopes 2 (see FIG. 3), a base 3, a cover 4, a power supply board 5, control boards 6 and plates 7. Here, the sensor mount 1 and the gyroscope 2 are an example of a "sensor arrangement part" and an example of a "sensor", respectively, in the claims. Also, the cover 4 and the plates 7 are an example of a "shielding cover" and examples of a "shielding lid", respectively, in the claims. Also, the control boards 6 are examples of a "controller" in the claims.

Two connectors 8 for connecting to the power supply board 5 to an external power supply (not shown) and for transmitting/receiving signals are attached to the sensor mount 1. The connectors 8 are connected to the power supply board 5 through flexible cables 8*a*. The flexible cables 8*a* are provided to the sensor apparatus 100 with being bent. Any of FPC (Flexible printed Circuit) and FFC (Flexible Flat Cable) can be used as the flexible cables 8*a*.

Figure 2:
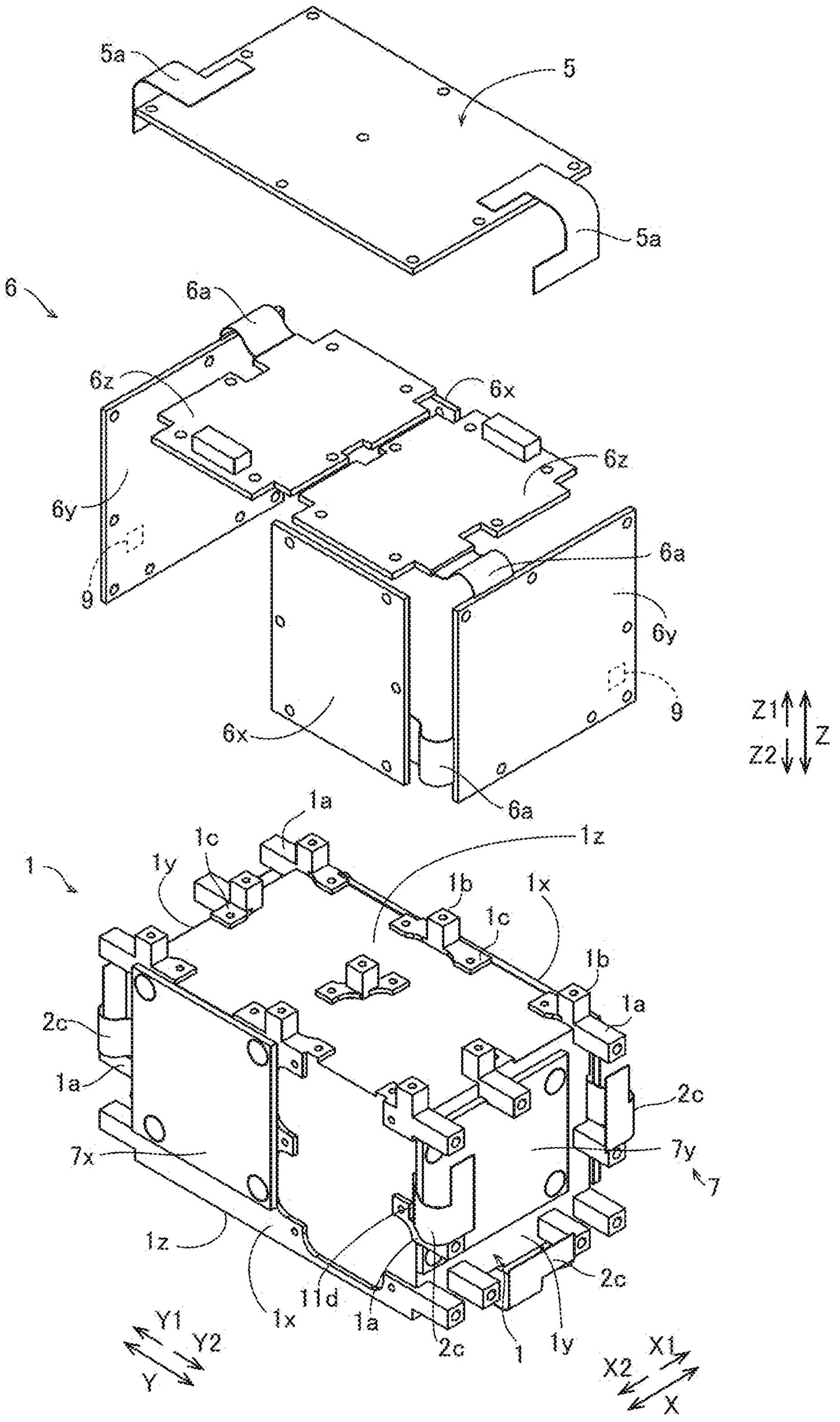
FIG. 2 is an exploded perspective view showing a sensor mount, and control and power supply boards according to the one embodiment.

The sensor mount 1 has a rectangular parallelepiped shape, as shown in FIG. 2. Also, the sensor mount 1 includes a pair of X-axis surfaces 1*x*, which extend perpendicular to an X axis, a pair of Y-axis surfaces 1*y*, which extend perpendicular to a Y axis, and a pair of Z-axis surfaces 1*z*, which extend perpendicular to a Z axis. Here, the X-axis surfaces 1*x* are examples of a "first surface" and a "surface of the sensor arrangement part" in the claims. Also, the Y-axis surfaces 1*y* are examples of a "second surface" and the "surface of the sensor arrangement part" in the claims. Also, the Z-axis surface 1*z* on a Z2 side of the pair of Z-axis surfaces 1*z* is an example of a "third surface" in the claims. Also, the X-axis is an example of a "first axis" in the claims. Also, the Y-axis is an example of a "second axis" in the claims. Also, the Z-axis is an example of a "third axis" in the claims. Here, in this embodiment, the Z axis is an axis that extends in a vertical direction.

The sensor mount 1 includes a plurality of Y-axis protrusions 1*a* which are arranged on each of the pair of Y-axis surfaces 1*y* to protrude from the Y-axis surfaces 1*y*. The Y axis control boards 6*y* described later are connected (fastened) to the Y-axis protrusions 1*a*.

Also, the sensor mount 1 includes a plurality of Z-axis protrusions 1*b* which are arranged on the Z-axis surface 1*z* on the Z1 side to protrude from the Z-axis surface 1*z*. The power supply board 5 is connected (fastened) to the Z-axis protrusions 1*b*. Also, the sensor mount 1 includes a plurality of Z-axis protrusions 1*c* which are arranged on the Z-axis surface 1*z* on the Z1 side to protrude from the Z-axis surface 1*z*. A protrusion amount of the Z-axis protrusions 1*c* is smaller than a protrusion amount of the Z-axis protrusions 1*b*. The Z-axis control boards 6*z* described later are connected (fastened) to the Z-axis protrusions 1*c*.

The sensor mount 1 is also formed of metal. Specifically, the sensor mount 1 is formed of a non-magnetic metal (e.g., aluminum alloy). In other words, the sensor mount 1 provides electromagnetic (magnetic flux) shielding. Also, the sensor mount 1 is fixed to the base 3 by screws and the like (not shown) for fastening the sensor mount to the base 3.

The cover 4 is arranged to cover the sensor mount 1, and has at least one opening 4*d*, as shown in FIG. 1. Specifically, the cover 4 has a box shape for accommodating the sensor mount 1. The cover 4 is opened on its Z2 side. Specifically, the sensor mount 1 is accommodated in accommodation space defined by the cover 4 and the base 3. In other words, the cover 4, the base 3 and the connectors 8 cover the sensor mount 1 so that the sensor mount 1 is not exposed. The opening 4*d* is an example of a "first opening" in the claims. Here, the sensor mount 1 may be covered by the cover 4 without the cut-out parts 4*c*, which will be described later, and the base 3 so that the sensor mount 1 is not exposed.

The cover 4 is formed of metal. Specifically, the cover 4 is formed of a non-magnetic metal (e.g., aluminum alloy). In other words, the cover 4 provides electromagnetic (magnetic flux) shielding.

The cover 4 is fastened to the base 3. Specifically, a flange 4*a* to be in surface contact with the base 3 is included on an end of the cover 4 on a base 3 side (Z2 side). The cover 4 is fixed to the base 3 by fastening the flange 4*a* to the base 3 by using screws 4*b* and the like. Also, the cover 4 has two cut-out parts 4*c* to expose the two connectors 8. Here, the flange 4*a* of the cover 4 is in contact with a surface 3*a* of the base 3 on the Z1 side. Also, gaskets for interrupting electromagnetic noise are arranged on boundaries between the connectors 8 and the cut-out parts 4*c* of the cover 4. The gaskets are formed of an electrically conductive material.

Also, the sensor apparatus 100 includes a pair of sensor sets 10. The sensor sets 10 include the gyroscopes 2, acceleration sensors 9, power supply circuits 5*b*, and the control boards 6 (control circuits 6*b*). The pair of sensor sets 10 have the same configuration as each other. The pair of sensor sets 10 are arranged side by side in a Y direction.

As shown in FIG. 2, the control board 6 includes X-axis control boards 6*x*, Y-axis control boards 6*y*, and Z-axis control boards 6*z*. Specifically, each of the pair of sensor sets 10 (see FIG. 1) includes a control board set including the X-axis control board 6*x*, the Y-axis control board 6*y*, and the Z-axis control board 6*z*. In each control board set, the X-axis control board 6*x* and the Y-axis control board 6*y* are connected to each other by the wiring part 6*a*, and the Z-axis control board 6*z* and the Y-axis control board 6*y* are connected to each other by the wiring part 6*a*.

A pair of X-axis control boards 6*x* are attached to the pair of X-axis surfaces 1*x* of the sensor mount 1. A pair of Y-axis control boards 6*y* are attached to the pair of Y-axis surfaces 1*y* of the sensor mount 1. The Z-axis control boards 6*z* in the pair of sensor sets 10 are attached to the Z-axis surface 1*z* on the Z1 side in the pair of Z-axis surfaces 1*z* of the sensor mount 1. The two Z-axis control boards 6*z* attached to the Z-axis surface 1*z* are arranged side-by-side in the Y direction.

The X-axis control board 6*x* for an X1 side is arranged in a Y1-side part of the X-axis surface 1*x* on the X1 side. The X-axis control board 6*x* for an X2 side is arranged in a Y2-side part of the X-axis surface 1*x* on the X2 side.

In addition, the control board 6 includes a microcontroller, a power supply, and the like (not shown). The control board 6 also includes an acceleration sensor 9. Here, in FIG. 2, each acceleration sensor 9 is schematically shown.

The power supply board 5 is arranged to cover the two Z-axis control boards 6*z* on the Z1 side. The power supply board 5 is connected to the control boards 6 (the pair of Y-axis control boards 6*y*) by wiring parts 5*a*. Specifically, the power supply board 5 includes power supply circuits 5*b* (see FIG. 5) for supplying power to the control circuits 6*b* (see FIG. 5) included in the control boards 6 through the wiring parts 5a. The power circuits 5b also supply power to the gyroscopes 2 and acceleration sensors 9. Each of the sensor sets 10 includes the power circuit 5b and the control circuit 6b. Also, each control circuit 6b receives information (detection values) from its corresponding gyroscopes 2, its corresponding acceleration sensor 9, and the like.

Figure 3:
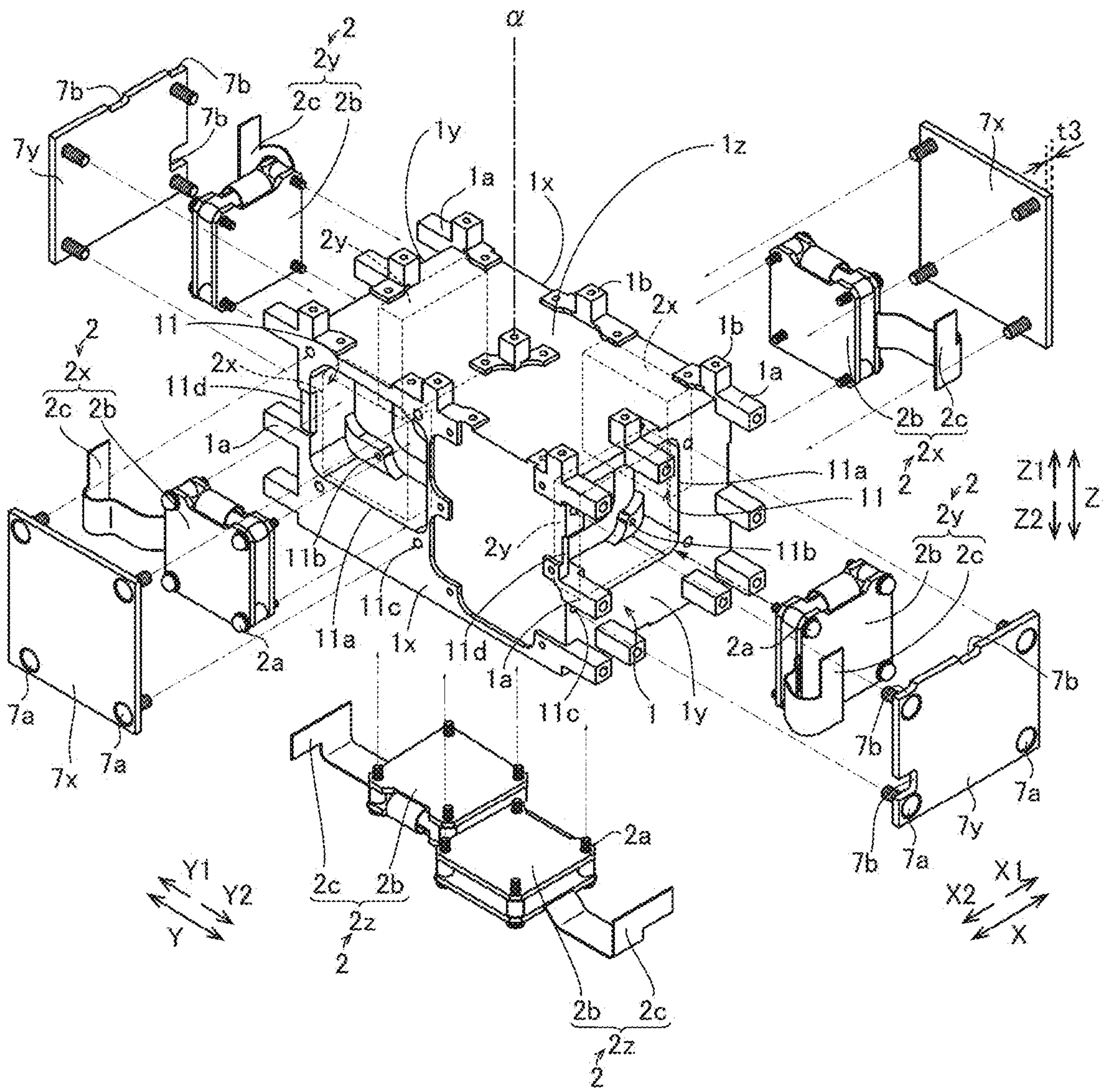
FIG. 3 is an exploded perspective view showing the sensor mount, gyroscopes, and plates according to the one embodiment.
Figure 4:
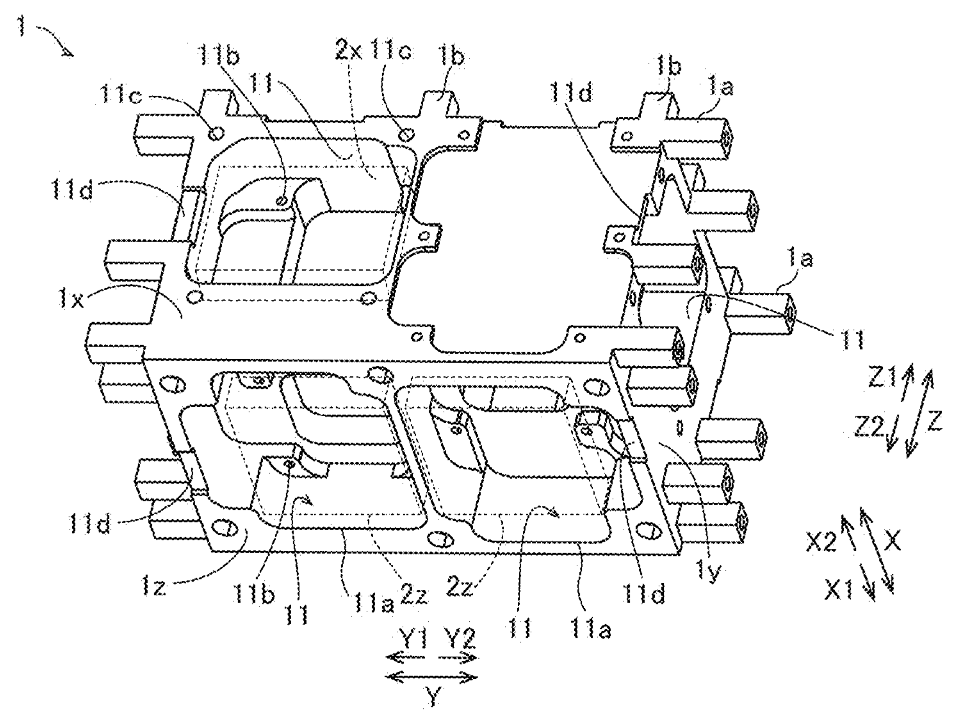
FIG. 4 is a perspective view of the sensor mount according to the one embodiment as diagonally viewed from a lower side.
Figure 5:
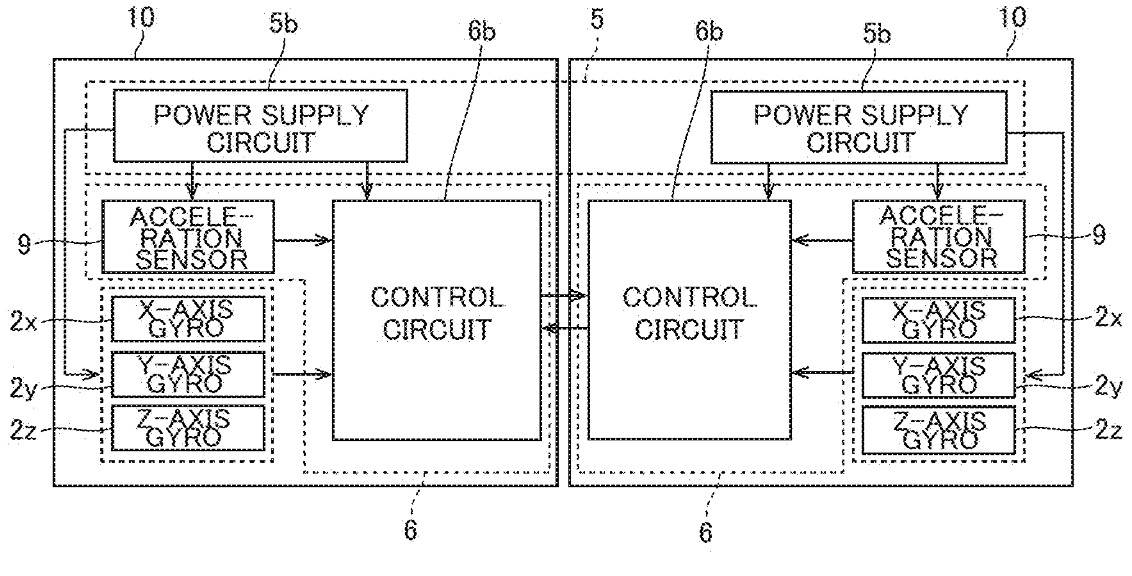
FIG. 5 is a block diagram showing a configuration of a sensor apparatus according to the one embodiment.

The plurality of gyroscopes 2 are arranged on the sensor mount 1 as shown in FIG. 3. The sensor mount 1 includes a plurality of recessed parts 11 which are opened in different directions from each other and each of which accommodates corresponding one of the plurality of gyroscopes 2. Specifically, the recessed parts 11 are arranged in the pair of X-axis surfaces 1x, the pair of Y-axis surfaces 1y, and the Z-axis surface 1z on the Z2 side of the sensor mount 1. Each of the pairs of X-axis surfaces 1x has one recessed part 11. Also, each of the pairs of Y-axis surfaces 1y has one recessed part 11. Also, the Z-axis surface 1z on the Z2 side has two recessed parts 11 as shown in FIG. 4. The two recessed parts 11 in the Z-axis surface 1z are arranged side by side in the Y direction (see FIG. 4).

Each of the plurality of gyroscopes 2 is accommodated in corresponding one of the recessed parts 11. Specifically, the gyroscope 2 is accommodated in the recessed part 11 not to protrude from an opened end 11a of the recessed part 11.

Also, the gyroscope 2 is fixedly arranged in the recessed part 11 by screwing screws 2a provided in four corners of the gyroscope 2 to screw insertion holes 11b arranged in the recessed part 11.

The gyroscopes 2 include a plurality of gyroscopes 2 for detecting a common type of physical quantities acting in two or more directions different from each other. All of the gyroscopes 2 that are arranged in the plurality of recessed parts 11 of the sensor arrangement part 1 and measure the common type of physical quantities are identical to each other in design. Specifically, the gyroscopes 2 include X-axis gyroscopes 2x, Y-axis gyroscopes 2y and Z-axis gyroscopes 2z corresponding to X, Y and Z axes, which are perpendicular to each other. The gyroscopes include two X-axis gyroscopes 2x, two Y-axis gyroscopes 2y and two Z-axis gyroscopes 2z. That is, the gyroscopes include a plurality of (specifically, a pair of) sensor sets 10 each of which includes the X-axis gyroscope 2x, the Y-axis gyroscope 2y and the Z-axis gyroscope 2z. Here, one of the pair of sensor sets 10 is provided as a backup (redundant) set of sensors for another sensor set 10. Also, the X-axis gyroscopes 2x are examples of a "first-axis sensor" in the claims. Also, the Y-axis gyroscopes 2y are examples of a "second-axis sensor" in the claims. Also, the Z-axis gyroscopes 2z are examples of a "third-axis sensor" in the claims.

Also, the pair of sensor sets 10 are arranged on the common sensor mount 1. That is, the sensor apparatus 100 includes the single sensor mount 1 on which the pair of sensor sets 10 are commonly arranged.

Here, in this embodiment, the pair of X-axis gyroscopes 2x are arranged rotational symmetric to each other with respect to an axis line x that passes through a center of gravity of the sensor mount 1 and extends in the Z axis; the pair of Y-axis gyroscopes 2y are arranged rotational symmetric to each other with respect to the axis line x; and the pair of Z-axis gyroscopes 2z are arranged rotational symmetric to each other with respect to the axis line α. As a result, absolute values of detection values of each pair of sensors in the sensor sets 10 become the same as each other. For this reason, it is not necessary to provide an interface board for performing calculation based on the detection values of each pair of sensors in the sensor sets 10. Here, the sensor mount 1 has a rotational symmetric shape, which is rotational symmetric with respect to the axis line x. Note that "rotational symmetric" refers to a broad sense that includes not only perfect rotational symmetry but also rotational symmetry with small errors that bring the absolute values of the detection values of each pair of sensors in the sensor sets 10 in the same range. In other words, the pair of X-axis gyroscopes 2x, the pair of Y-axis gyroscopes 2y or the pair of Z-axis gyroscopes 2z may be arranged rotational asymmetric with respect to the axis line α in the sensor mount 1, which has the rotational symmetric shape with respect to the axis line x, as long as the rotational asymmetry affects the detection values of each pair of sensors in the sensor sets 10.

In detailed description, the pair of X-axis gyroscopes 2x are arranged at the same height position as each other in the Z direction. Also, the pair of X-axis gyroscopes 2x are offset from each other in the Y direction. Specifically, the X-axis gyroscope 2x on the X1 side is arranged in the recessed part 11 that is located in the Y2-side part of the X-axis surface 1x on the X1 side. Also, X-axis gyroscope 2x on the X2 side is arranged in the recessed part 11 that is located in the Y1-side part of the X-axis surface 1x on the X2 side.

Also, the pair of Y-axis gyroscopes 2y are arranged at the same height position as each other in the Z direction. Also, the pair of Y-axis gyroscopes 2y are offset from each other in the X direction. Specifically, the Y-axis gyroscope 2y on the Y1 side is arranged in the recessed part 11 that is located in the X1-side part of the Y-axis surface 1y on the Y1 side. The Y-axis gyroscope 2y on the Y2 side is arranged in the recessed part 11 that is located in the X2-side part of the Y-axis surface 1y on the Y2 side.

Also, the pair of Z-axis gyroscopes 2z are arranged at the same height position as each other in the Z direction. Also, the pair of Z-axis gyroscopes 2z are offset from each other in the X direction. The Z-axis gyroscope 2z on the Y1 side is arranged in the recessed part 11 that is located closer to the X1 side in the Z-axis surface 1z on the Z2 side. The Z-axis gyroscope 2z on the Y2 side is arranged in the recessed part 11 that is located closer to the X2 side in the Z-axis surface 1z on the Z2 side.

Also, in this embodiment, two or more of the plurality of recessed parts 11 of the sensor mount 1 in which the X-axis gyroscopes 2x have a common shape. Two or more of the plurality of recessed parts 11 in which the Y-axis gyroscopes 2y have a common shape. Two or more of the plurality of recessed parts 11 in which the Z-axis gyroscopes 2z have a common shape.

Here, since the pair of sensor sets 10 are arranged symmetric (rotational symmetric) to each other with respect to an axis, polarity of the detection values of each pair of sensors in the sensor sets 10 are opposite to each other. The control boards 6 (control circuits 6b) adjust the detection values of each pair of sensors in the sensor sets 10 to their positive or negative values. Also, since the pair of sensor sets 10 are arranged symmetric (rotational symmetric) to each other with respect to the axis, the pair of control boards 6 can have a common configuration. In other words, the pair of control boards have the common configuration in terms that each of the pair of control boards 6 includes the X-axis control board 6x, the Y-axis control board 6y, and the Z-axis control board 6z.

Also, in this embodiment, the pair of X-axis gyroscopes 2x are arranged in the recessed parts 11 in the pair of X-axis surfaces 1x, which are arranged on sides opposite to each other. Also, the pair of Y-axis gyroscopes 2y are arranged in the recessed parts 11 in the pair of Y-axis surfaces 1y, which are arranged on sides opposite to each other. That is, the gyroscopes 2 (2*x*, 2*y*) are arranged on their corresponding one of four side surfaces (1*x*, 1*y*) of the sensor mount 1.

The Z-axis gyroscopes 2*z* are arranged in their corresponding one of the two recessed parts 11 in the Z-axis surface 1*z* on the Z2 side. Here, no recessed part 11 is arranged on the Z-axis surface 1*z* on the Z1 side.

Here, in this embodiment, the plates 7 are arranged between the recessed parts 11 and the cover 4, and are arranged to cover the recessed parts 11 so as not to expose the gyroscopes 2 arranged in the recessed parts 11 of the sensor mount 1. Specifically, the plates 7 are arranged to overlap the entire recessed parts 11. Also, each plate 7 is fixed to the sensor mount 1 by inserting screws 7*a* arranged in four corners of the plate 7 into screw insertion holes 11*c* arranged outside corresponding one of recessed parts 11.

Also, the plates 7 provide electromagnetic noise shielding. Specifically, the plates 7 are formed of metal. In detailed description, the plates 7 are formed of a non-magnetic metal (e.g., aluminum alloy).

Also, in this embodiment, each plate 7 has a plate-like shape extending in corresponding one of the pair of X-axis surfaces 1*x* or corresponding one of the pair of Y-axis surfaces 1*y* of the sensor mount 1. Specifically, each plate 7 is formed in a square shape. The plate 7 is attached to the Y2-side part of the X-axis surface 1*x* on the X1 side, which is formed in a rectangular shape. Also, the plate 7 is attached to the Y1-side part of the X-axis surface 1*x* on the X2 side, which is formed in a rectangular shape.

Also, in this embodiment, the plates 7 include the X-axis plates 7*x* covering the recessed parts 11 arranged in the X-axis surfaces 1*x*, and the Y-axis plates 7*y* covering the recessed parts 11 arranged in the Y-axis surfaces 1*y*. The X-axis plates 7*x* are arranged side by side adjacent to the X-axis control boards 6*x* in the Y direction without overlapping the X-axis control boards 6*x* (see FIG. 1). The Y-axis plates 7*y* are arranged to overlap the Y-axis control boards 6*y* (see FIGS. 1 and 2). Here, the X-axis plates 7*x* and the Y-axis plates 7*y* are examples of the "shielding lid" in the claims, respectively.

Each Y-axis plate 7*y* has a plurality of cut-out parts 7*b* avoiding the Y-axis protrusions 1*a* of the sensor mount 1. Each X-axis plate 7*x* has no cut-out part.

In this embodiment, the base 3 is fixed to the sensor mount 1, and is arranged to close the opening 4*d* of the cover 4 and to cover at least one of the recessed parts 11 so as to shield against electromagnetic noise. Specifically, the base 3 (see FIG. 1) is arranged to cover the recessed parts 11 (see FIG. 4) arranged in the Z-axis surface 1*z* of the sensor mount 1 on the Z2 side. The base 3 is arranged to cover the entire surface of the Z-axis surface 1*z* on the Z2 side. That is, the two recessed parts 11 in which the two Z-axis gyroscopes 2*z* are arranged are covered by the common (single) base 3 in the Z-axis surface 1*z*.

In this embodiment, a projected area of the base 3 as viewed in a direction (Z direction) perpendicular to surfaces of the base 3 and the shielding cover 4 that face each other is larger than an opening area of the opening 4*d* of the cover 4. That is, the entire area of the opening 4*d* of the cover 4 is covered by the base 3.

Also, the base 3 provides electromagnetic noise shielding. Specifically, the base 3 is formed of metal. In detailed description, the base 3 is formed of a non-magnetic metal (e.g., aluminum alloy). That is, the cover 4, the plates 7, the sensor mount 1, and the base 3 are formed of the same material.

Also, in this embodiment, a thickness t1 of the base 3 (see FIG. 1) is greater than a thickness t2 of the cover 4 (see FIG. 1). Specifically, the thickness t1 of the base 3 is not smaller than twice (e.g., triple) the thickness t2 of the cover 4.

Also, the thickness t1 of the base 3 (see FIG. 1) is greater than a thickness t3 of the plate 7 (see FIG. 3). Specifically, the thickness t1 of the base 3 is not smaller than twice (e.g., triple) a thickness t3 of the plate 7. Here, no plate for shielding against electromagnetic noise is arranged between the base 3 and the Z-axis gyroscopes 2*z*. In other words, the base 3 and each Z-axis gyroscope 2*z* are arranged to face each other without the plate between them. The Z-axis gyroscope 2*z* is enclosed between each recessed part 11 and the base 3 to shield the Z-axis gyroscope 2*z* against electromagnetic noise.

Also, at least one gyroscope 2 (specifically, all of the X-axis gyroscopes 2*x*, the Y-axis gyroscopes 2*y* and the Z-axis gyroscopes 2*z*) includes a sensor main body 2*b*, and a connection wiring part 2*c* connecting the sensor main body 2*b* to the control board 6 (the Y-axis control board 6*y*). The gyroscopes 2 and the control board 6 (Y-axis control board 6*y*) that are included in the sensor set 10 common to each other are connected by the connection wiring parts 2*c*.

Here in this embodiment, at least one recessed part 11 (specifically, all of the recessed parts 11) of the sensor mount 1 includes a cut-out part 11*d* through which the connection wiring part 2*c* is drawn out. The cut-out parts 11*d* are arranged in the opened ends 11*a* of the recessed parts 11. In other words, the connection wiring parts 2*c* are drawn out through the cut-out parts 11*d* with recessed part 11 being covered by the plates 7 (base 3) (see FIG. 6). Here, the cut-out parts 11*d* are examples of a "second opening" in the claims. Here, the cut-out parts 11*d* may be arranged in the plates 7 or in both the recessed parts 11 and the plates 7.

Figure 6:
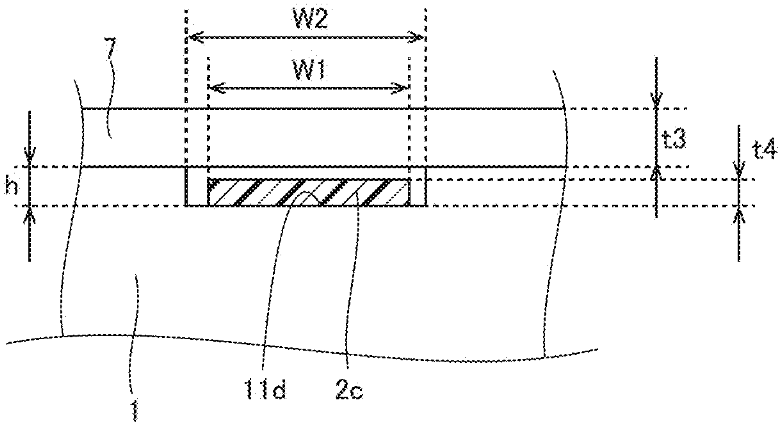
FIG. 6 is a schematic sectional view showing a relation between a connection wiring part and a cut-out part in the one embodiment.

As shown in FIG. 6, the connection wiring parts 2*c* have the thickness t3 (e.g., 0.8 mm). The cut-out parts 11*d* have a depth h (e.g., 1 mm) greater than the thickness t3. Also, the connection wiring parts 2*c* have a width W1. Also, the cut-out parts 11*d* have a width W2 greater than the width W1. Here, the plurality of cut-out parts 11*d* have the same size as each other.

Also, in this embodiment, the connection wiring parts 2*c* of the gyroscope 2 include flexible cables. In other words, the connection wiring parts 2*c* have flexibility (softness). The connection wiring parts 2*c* are formed of polyimide, for example. The connection wiring parts 2*c* include flexible cables so that the flexible cables can absorb shock even if vibration occurs. As a result, it is possible to prevent disconnection of the connection wiring parts 2*c* from the control boards 6. Also, since the connection wiring parts 2*c* include flexible cables, it is possible to bend the connection wiring parts 2*c* at an angle that can easily draw out the connection wiring parts in the recessed parts 11 through the cut-out parts 11*d*. Accordingly, even if a clearance between the cut-out part 11*d* and the connection wiring part 2*c* is reduced, it is possible to easily draw out the connection wiring part 2*c* through the cut-out part 11*d*. Since the aforementioned clearance can be reduced, it is possible to increase a frequency range of electromagnetic noise shielding provided by the plates 7 and the base 3 to a wider range (increase an upper limit on a high frequency side).

The connection wiring parts 2*c*, which extend from the X-axis gyroscope 2*x*, the Y-axis gyroscope 2*y* and the Z-axis gyroscopes 2*z* in each of the pair of sensor sets 10, are connected to the Y-axis control boards 6*y* with being bent (deformed).

Figure 7:
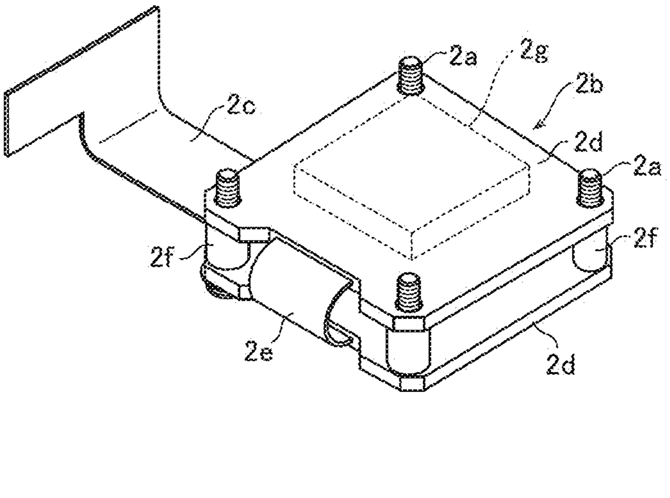
FIG. 7 is a perspective view showing a configuration of the gyroscope according to the one embodiment.

Also, the gyroscope 2 includes a rigid flexible substrate, as shown in FIG. 7. The rigid flexible board refers to a board including rigid and flexible parts. The sensor main body 2*b* includes two rigid parts 2*d*, and a flexible part 2*e* connecting the rigid parts 2*d* to each other. The two rigid parts 2*d* are arranged to face each other by bending the flexible part 2*e*. Here, the connection wiring part 2*c* extends from one of the two rigid parts 2*d*. Also, the flexible part 2*e* is formed of the same material (i.e., polyimide) as the connection wiring part 2*c*.

Also, the sensor main body 2*b* includes spacers 2*f* arranged between a pair of rigid parts 2*d* arranged to face each other. Predetermined space is formed between the two rigid parts 2*d* by the spacer 2*f*. The spacers 2*f* are arranged in four corners of each rectangular (square) rigid part 2*d*. Also, the spacers 2*f* have a cylindrical shape. The screws 2*a* are arranged to pass through the spacers 2*f* having the cylindrical shape. Dotted lines in FIG. 7 represent a sensor head 2*g*. The sensor head 2*g* is an electromagnetic type sensor head using MEMS technology, for example.

Advantages of the Embodiment

In this embodiment, the following advantages are obtained.

In this embodiment, as described above, the sensor apparatus 100 is configured including the plates 7 for shielding against electromagnetic noise, which are arranged between the recessed parts 11 and the cover 4, and are arranged to cover the recessed parts 11 so as not to expose the gyroscopes 2 arranged in the recessed parts 11 of the sensor mount 1. Accordingly, the plates 7 can provide electromagnetic noise shielding even if electromagnetic noise enters an interior of the shielding cover 4. In other words, electromagnetic noise shielding can be duplicately provided by the cover 4 and the plates 7. As a result, even if a plurality of gyroscopes 2 are arranged in the cover 4, and the plurality of gyroscopes 2 are arranged in different positions and orientations in the sensor mount 1, an outer shield is formed by the cover 4 and the base 3, and inner shields are formed by the plates 7 and the recessed parts 11 of the sensor mount 1. Consequently, electromagnetic noise shielding is duplicately provided. Here, inner shields for the Z-axis gyroscopes 2*z* are formed by the recessed parts 11 of the sensor mount 1 and the base 3 by bringing the base 3 and the sensor mount 1 into tight contact with each other. In particular, in a case in which the recessed parts 11 are formed by cutting-out machining, the gyroscopes will be covered by the recessed parts 11 without any gaps except opened sides of the recessed parts 11 for the gyroscopes 2. As these results, it is possible to reduce difference of influence of noise between the plurality of gyroscopes 2 in a case in which the plurality of gyroscopes 2 for detecting the same type of physical quantities are arranged in positions and orientations different from each other.

Also, since the sensor head 2*g* is an electromagnetic type sensor head using MEMS technology, the sensor head 2*g* includes a magnet. For this reason, an advantage of reduction of difference of influence of noise between the plurality of gyroscopes 2 in a case in which the plurality of gyroscopes 2 for detecting the same type of physical quantities are arranged in positions and orientations different from each other is particularly effective for the electromagnetic type sensor head 2*g* using MEMS technology. Also, even in a case in which the sensor head 2*g* is a piezoelectric or electrostatic type sensor head, which does not include the magnet, since very small signals are processed, the advantage of reduction of difference of influence of noise between the plurality of gyroscopes 2 can be obtained similar to the electromagnetic type sensor head 2*g*.

In this embodiment, as described above, the sensor apparatus 100 is configured including the recessed parts 11 of the sensor mount 1 having cut-out parts 11*d* through which the connection wiring parts 2*c* are drawn out. Accordingly, even in a case in which the recessed parts 11 are covered by the plates 7, the connection wiring parts 2*c* can be easily drawn out from the recessed parts 11 through the cut-out parts 11*d*.

In this embodiment, as described above, the sensor apparatus 100 is configured including the connection wiring parts 2*c* of the gyroscope 2 having flexible cables. Accordingly, since the connection wiring parts 2*c* can be drawn out from the recessed parts 11 while being bent, it is possible to easily draw the connection wiring parts 2*c* out of the recessed part 11.

In this embodiment, as described above, the sensor apparatus 100 is configured including the base 3, which is fixed to the sensor mount 1, and is arranged to close the opening 4*d* of the cover 4 and to cover the recessed parts 11 that are arranged in the Z-axis surface 1*z* so as to shield against electromagnetic noise. Accordingly, since the base 3, which is fixed to the sensor mount 1, also serves as a part for shielding the Z-axis gyroscope 2*z*, it is possible to prevent a configuration of the sensor apparatus 100 from becoming complicated while reducing the number of parts.

In this embodiment, as described above, a projected area of the base 3 as viewed in a direction (Z direction) perpendicular to surfaces of the base 3 and the shielding cover 4 that face each other is larger than an opening area of the opening 4*d* of the cover 4. Accordingly, since the opening 4*d* of the cover 4 is entirely covered by the base 3, it is possible to effectively reduce electromagnetic noise entering the shielding cover 4.

In this embodiment, as described above, all of the gyroscopes 2 that are arranged in the plurality of recessed parts 11 of the sensor arrangement part 1 and measure the common type of physical quantities are identical to each other in design. Accordingly, since correction control of the sensor apparatus 100 for correcting difference between the gyroscopes 2 due to difference of designs can be eliminated, such elimination together with advantages of the present invention including reduction of influences of electromagnetic noise from the outside of the sensor apparatus 100 and reduction of evenness of noise entering the gyroscopes 2 allows easy correction control of the sensor apparatus 100.

In this embodiment, as described above, the sensor mount 1 includes X-axis surfaces 1*x* that extend perpendicular to the X axis and include the recessed parts 11 in which the X-axis gyroscopes 2*x* are arranged; Y-axis surfaces 1*y* that extend perpendicular to the Y axis and include the recessed parts 11 in which the Y-axis gyroscopes 2*y* are arranged; and a Z-axis surface 1*z* that extends perpendicular to the Z axis and includes the recessed parts 11 in which the Z-axis gyroscopes 2*z* are arranged. Accordingly, it is possible to reduce difference of influence of noise between the X-axis gyroscopes 2*x*, the Y-axis gyroscopes 2*y*, and the Z-axis gyroscopes 2*z*. In this embodiment, as described above, a plurality of sensor sets 10 are provided. Accordingly, even in a case in which the plurality of sensor sets 10 are provided, it is possible to reduce difference of influence of noise between the X-axis gyroscopes 2*x*, the Y-axis gyroscopes 2*y*, and the Z-axis gyroscopes 2*z*.

In this embodiment, as described above, two or more of the plurality of recessed parts 11 of the sensor mount 1 in which the X-axis gyroscopes 2*x* have a common shape. Two or more of the plurality of recessed parts 11 in which the Y-axis gyroscopes 2*y* have a common shape. Two or more of the plurality of recessed parts 11 in which the Z-axis gyroscopes 2*z* have a common shape. Accordingly, since two or more of the plurality of recessed parts 11 have the common shape, it is possible to simplify production of the sensor arrangement part 1 as compared with a case in which the two or more of the plurality of recessed parts 11 have shapes different from each other. Also, the two or more of the plurality of recessed parts 11 for the pair of X-axis gyroscopes 2*x* (pair of Y-axis gyroscopes 2*y*, pair of Z-axis gyroscopes 2*z*) have the common shape, distances between interior surfaces of the recessed parts 11 and exterior surfaces of the gyroscopes 2 can be the same in the pair of X-axis gyroscopes 2*x* (pair of Y-axis gyroscopes 2*y*, pair of Z-axis gyroscopes 2*z*), and as a result, it is possible to reduce noise influence difference between the pair of X-axis gyroscopes 2*x* (between the pair of Y-axis gyroscopes 2*y*, between the pair of Z-axis gyroscopes 2*z*).

In this embodiment, as described above, the sensor mount 1 has a rectangular parallelepiped shape. Accordingly, it is possible to easily arrange the X-axis gyroscopes 2*x*, the Y-axis gyroscopes 2*y* and the Z-axis gyroscopes 2*z* to correspond to the X axis, the Y axis and the Z axis, respectively, which are perpendicular to each other.

In this embodiment, as described above, the sensor apparatus 100 is configured including the gyroscopes 2. Here, the gyroscopes 2 process very small signals, and are susceptible to electromagnetic noise. For this reason, electromagnetic noise shielding provided by the plates 7 is particularly effective at properly operating the gyroscopes 2.

In this embodiment, as described above, the sensor apparatus 100 is configured including the plates 7, which include the X-axis plates 7*x* covering the recessed parts 11 arranged in the X-axis surfaces 1*x*, and the Y-axis plates 7*y* covering the recessed parts 11 arranged in the Y-axis surfaces 1*y*. Accordingly, since the X-axis plates 7*x* and the Y-axis plates 7*y* provide electromagnetic noise shielding even if electromagnetic noise enters an interior of the shielding cover 4, it is possible to further prevent anomalies caused by electromagnetic noise in the X-axis gyroscopes 2*x* and the Y-axis gyroscopes 2*y*.

In this embodiment, as described above, the sensor apparatus 100 is configured including a plurality of recessed parts 11 in which a plurality of Z-axis gyroscopes 2*z* are arranged are covered by the common base 3 in the Z-axis surface 1*z*. Consequently, it is possible to reduce the number of parts as compared with a case in which the plurality of recessed parts 11 in which the plurality of Z-axis gyroscopes 2*z* are arranged are covered by parts different from each other.

In this embodiment, as described above, the sensor apparatus 100 is configured including the pair of X-axis gyroscopes 2*x* being arranged in the recessed parts 11 in the pair of X-axis surfaces 1*x*, which are arranged on sides opposite to each other, and the pair of Y-axis gyroscopes 2*y* being arranged in the recessed parts 11 in the pair of Y-axis surfaces 1*y*, which are arranged on sides opposite to each other. Accordingly, it is possible to easily reduce an area of the X-axis surface 1*x* (Y-axis surface 1*y*) as compared with a case in which the X-axis gyroscopes 2*x* are arranged in a common X-axis surface 1*x* (the Y-axis gyroscopes 2*y* are arranged in a common Y-axis surface 1*y*). Consequently, it is possible to easily reduce size of the sensor mount 1 (sensor apparatus 100).

In this embodiment, as described above, the sensor apparatus 100 is configured including two sensor sets 10, which are arranged symmetric to each other with respect to an axis line α that passes through a center of gravity of the sensor mount 1 and extends in the Z axis. Accordingly, since absolute values of detection values of the pair of sensor sets 10 can be the same, even if an abnormality occurs in one of the pair of sensor sets 10, detection values of another of the pair of sensor sets 10 can be used.

MODIFIED EMBODIMENTS

Note that the embodiment disclosed this time must be considered as illustrative in all points and not restrictive. The scope of the present invention is not shown by the above description of the embodiments but by the scope of claims for patent, and all modifications (modified embodiments) within the meaning and scope equivalent to the scope of claims for patent are further included.

Although it has been illustratively described in the aforementioned embodiment that each of the cover 4, the sensor mount 1, and the base 3 is formed as a unitary part each of the cover 4, the sensor mount 1, and the base 3 may include a plurality of parts. However, in a case in which the sensor sets 10 are used as a "pair" of sensor sets, the sensor mount 1 is preferably integrally formed as a unitary part in terms of positioning the pair of X-axis gyroscopes 2*x* (pair of Y-axis gyroscopes 2*y*, pair of Z-axis gyroscopes 2*z*) in the sensor sets 10.

Also, although it has been illustratively described in the aforementioned embodiment that the cover 4, the sensor mount 1, and the base 3 are separate parts, two or more of these parts may be integrally formed as a unitary part. Also, although the sensor apparatus 100 includes the cover 4, the sensor mount 1, and the base 3 as separate parts from the viewpoint of manufacturing and assembling the sensor apparatus, the sensor apparatus 100 may include other functional separate parts from another viewpoint other than manufacturing and assembling the sensor apparatus.

For example, the example in which the gyroscope 2 (sensor) is arranged in the recessed part 11 of the sensor mount 1 (sensor arrangement part) has been shown in the aforementioned embodiment, the present invention is not limited to this. For example, a sensor (e.g., an acceleration sensor 9 or a temperature sensor) other than the gyroscope 2 may be arranged in the recessed part 11. Also, a plurality of types of sensors may be arranged in the recessed parts 11. Also, the recessed parts 11 that accommodate the same type of sensors arranged in proximity to each other may have a structure communicating with each other.

While the example in which the connection wiring part 2*c* of the gyroscope 2 (sensor) is drawn out through the cut-out part 11*d* (opening) of the recessed part 11 has been shown in the aforementioned embodiment, the present invention is not limited to this. For example, the connection wiring part 2*c* may be drawn out through a hole arranged in proximity to the opened end 11*a* of the recessed part 11.

While the example in which the connection wiring part 2*c* includes a flexible cable has been shown in the aforementioned embodiment, the present invention is not limited to this. For example, the connection wiring part 2*c* may be a cable without flexibility (softness) (e.g., busbar).

While the example in which each of the sensor mount 1 (sensor arrangement part), plates 7 (shielding lids), and the base 3 is formed of metal has been shown in the aforementioned embodiment, the present invention is not limited to this. For example, any of the sensor mount 1, the plates 7 and the base 3 may be formed of non-magnetic ceramics or a non-magnetic resin. From the viewpoint of heat dissipation, the sensor mount 1, the plates 7, and the base 3 are preferably formed of metal.

While the example in which the gyroscopes 2 (sensors) corresponding to the X axis (first axis), the Y axis (second axis), and the Z axis (third axis) are separately provided has been shown in the aforementioned embodiment, the present invention is not limited to this. A single gyroscope corresponding to all of the X, Y and Z axes may be provided.

While the example in which no plate for shielding against electromagnetic noise is arranged between the base 3 and the Z-axis gyroscopes 2*z* (third-axis sensor) has been shown in the aforementioned embodiment, the present invention is not limited to this. A plate for shielding against electromagnetic noise may be arranged between the base 3 and the Z-axis gyroscopes 2*z* (third-axis sensor). In this case, the base 3, the plate that is arranged between the base 3 and the Z-axis gyroscopes 2*z* are an example of the "shielding cover" and an example of the "shielding lid", respectively, in the claims.

While the example in which a thickness t1 of the base 3 is greater than a thickness t2 of the cover 4 (shielding cover) has been shown in the aforementioned embodiment, the present invention is not limited to this. The thickness t1 of the base 3 may be not greater than the thickness t2 of the cover 4.

While the example in which the base 3 is directly attached to the opening 4*d* of the cover 4 has been shown in the aforementioned embodiment, the present invention is not limited to this. Another part may be arranged over a part of or the entire of the opening 4*d* of the cover 4, and the base 3 may be attached to the opening 4*d* of the cover 4 through the another part. Also, airtightness between the cover 4 and the base 3 is not required.

While the example in which the sensor mount 1 (sensor arrangement part) has a rectangular parallelepiped shape has been shown in the aforementioned embodiment, the present invention is not limited to this. The sensor mount 1 may have a shape (e.g., cubic shape) other than the rectangular parallelepiped shape.

While the example in which the sensor apparatus 100 includes two sensor sets 10 each of which includes a set of the X-axis gyroscope 2*x* (first-axis sensor), the Y-axis gyroscope 2*y* (second-axis sensor) and the Z-axis gyroscope 2*z* (third-axis sensor) has been shown in the aforementioned embodiment, the present invention is not limited to this. The sensor apparatus 100 may include only one aforementioned sensor set 10. For example, the sensor apparatus 100 may include three or more aforementioned sensor sets 10.

While the example in which a pair of Z-axis gyroscope 2*z* (third-axis sensors) are arranged in a common Z-axis surface 1*z* (third surface) of the sensor mount 1 (sensor arrangement part) has been shown in the aforementioned embodiment, the present invention is not limited to this. The pair of Z-axis gyroscopes 2*z* may be arranged in the Z-axis surfaces 1*z*, which are arranged on sides opposite to each other. Also, a pair of X-axis gyroscopes 2*x* (first-axis sensors) may be arranged in a common X-axis surface 1*x* (first surface). Also, a pair of Y-axis gyroscopes 2*y* (second-axis sensors) are arranged in a common Y-axis surface 1*y* (second surface).

While the example in which a pair of sensor sets 10 are arranged symmetric with respect to an axis line x that extends in the Z axis (third axis) has been shown in the aforementioned embodiment, the present invention is not limited to this. Two sensor sets 10 may be arranged rotational symmetric with respect to an axis line x that passes through a center of gravity of the sensor mount 1 (sensor arrangement part) and extends in the X axis (first axis) or the Y axis (second axis). The pair of sensor sets 10 may be arranged origin symmetric with respect to an origin of the sensor mount 1. Pairs of sensors in the sensor sets 10 may be arranged side by side in the X direction, the Y direction, and the Z direction.

While the example in which the common cover 4, the common sensor mount 1, and the common base 3 are commonly provided to a plurality of sensor sets or a pair of sensor sets 10 has been shown in the aforementioned embodiment, the present invention is not limited to this. Any one or more of the cover 4, the sensor mount 1, and the base 3 may be separately provided to their corresponding sensor sets 10. For example, the base 3 may be commonly provided to a plurality of sensor sets 10, and the sensor mounts 1 and the covers 4 may be separately provided to their corresponding sensor sets 10.

While the example in which the recessed parts 11 of the sensor mount 1 include cut-out parts 11*d* through which the connection wiring parts 2*c* are drawn out has been shown in the aforementioned embodiment, the present invention is not limited to this. Instead of the cut-out parts 11*d* of the recessed parts 11, at least one plate 7 may include an opening (cut-out part) through which the connection wiring part 2*c* is drawn out. Also, in addition to the cut-out parts 11*d* of the recessed parts 11, at least one plate 7 may include an opening (cut-out part) through which the connection wiring part 2*c* is drawn out.

DESCRIPTION OF REFERENCE NUMERALS

1; sensor mount (sensor arrangement part)
1*x*; X-axis surface (first surface) (surface)
1*y*; Y-axis surface (second surface) (surface)
1*z*; Z-axis surface (third surface)
2; gyroscope (sensor)
2*b*; sensor main body
2*c*; connection wiring part
2*x*; X-axis gyroscope (first-axis sensor)
2*y*; Y-axis gyroscope (second-axis sensor)
2*z*; Z-axis gyroscope (third-axis sensor)
3; base
4; cover (shielding cover)
4*d*; opening (first opening)
6; control board (controller)
7; plate (shielding lid)
7*x*; X-axis plate (shielding lid)
7*y*; Y-axis plate (shielding lid)
10; sensor set
11; recessed part
11*d*; cut-out part (second opening)
100; sensor apparatus
t1; thickness (thickness of base)
t2; thickness (thickness of cover)
X; axis (first axis)
Y; axis (second axis)
Z; axis (third axis)
α; axis line

The invention claimed is:

1. A sensor apparatus comprising:
- a plurality of sensors for detecting a common type of physical quantities acting in two or more directions different from each other;
- a sensor arrangement part including a plurality of recessed parts that are opened in different directions from each other and in which the plurality of sensors are arranged;
- a shielding cover for shielding against electromagnetic noise, the shielding cover being arranged to cover the sensor arrangement part and provided with at least one first opening; and
- shielding lids for shielding against the electromagnetic noise, the shielding lids being arranged between the plurality of recessed parts and the shielding cover and covering the plurality of recessed parts to prevent exposure of the plurality of sensors that are arranged in the plurality of recessed parts.

2. The sensor apparatus according to claim 1 further comprising a controller for receiving information from the plurality of sensors, wherein at least one of the plurality of sensors includes a sensor main body, and a connection wiring part between the sensor main body and the controller, and at least one of the plurality of recessed parts of the sensor arrangement part and/or at least one of the shielding lids includes a second opening through which the connection wiring part is drawn out.

3. The sensor apparatus according to claim 2, wherein the connection wiring part of the sensor includes a flexible cable.

4. The sensor apparatus according to claim 1 further comprising a base for shielding against the electromagnetic noise, the base being fixed to the sensor arrangement part and arranged to close the first opening of the shielding cover and to cover at least one of the plurality of recessed parts.

5. The sensor apparatus according to claim 4, wherein a projected area of the base as viewed in a direction perpendicular to surfaces of the base and the shielding cover that face each other is larger than an opening area of the first opening of the shielding cover.

6. The sensor apparatus according to claim 1, wherein all of the plurality of sensors that are arranged in the plurality of recessed parts of the sensor arrangement part and measure the common type of physical quantities are identical to each other in design.

7. The sensor apparatus according to claim 6, wherein the plurality of sensors include one sensor set of a first-axis sensor, a second-axis sensor and a third-axis sensor corresponding a first axis, a second axis and a third axis perpendicular to each other or a plurality of sensor sets of first-axis sensors, second-axis sensors and third-axis sensors corresponding the first axis, the second axis and the third axis perpendicular to each other; and the sensor arrangement part includes a first surface that extends perpendicular to the first axis and includes the recessed part in which the first axis sensor is arranged, a second surface that extends perpendicular to the second axis and includes the recessed part in which the second axis sensor is arranged, and a third surface that extends perpendicular to the third axis and includes the recessed part in which the third axis sensor is arranged.

8. The sensor apparatus according to claim 7, wherein the plurality of sensors include the plurality of sensor sets of the first-axis sensors, the second-axis sensors and the third-axis sensors.

9. The sensor apparatus according to claim 8, wherein two or more of the plurality of recessed parts of the sensor arrangement part in which the first axis sensors are arranged have a common shape; two or more of the plurality of recessed parts of the sensor arrangement part in which the second axis sensors are arranged have a common shape; and two or more of the plurality of recessed parts of the sensor arrangement part in which the third axis sensors are arranged have a common shape.

10. The sensor apparatus according to claim 9, wherein the sensor arrangement part has a rectangular parallelepiped shape.

11. The sensor apparatus according to claim 10, wherein each of the first axis sensor, the second axis sensor and the third axis sensor included in each sensor set includes a gyroscope.

* * * * *